2,882,140

HERBICIDAL COMPOSITIONS AND THEIR PREPARATION

Norman Edward Searle, Wilmington, Del., assignor to E. I. du Pont de Nemours and Company, Wilmington, Del., a corporation of Delaware No Drawing. Application May 23, 1957
Serial No. 661,021

4 Claims. (Cl. 71—2.3)

This invention relates to novel halogen-containing arylcarbonyl arylcarbamoyl sulfides. This invention is also directed to herbicidal compositions containing these novel compounds and to methods of applying these compounds.

The search for compounds that exert profound and selective influence upon the growth of plants is of great importance. In recent years certain organic compounds have been found to exhibit plant growth regulant properties. Illustrative of such compounds are esters of 2,4-dichlorophenoxyacetic acid which have been used with considerable economic advantage to control broad-leaved weeds. However, some of the biologically active halogen-containing compounds are either quite volatile or are difficult to formulate for herbicidal or plant growth regulating applications. It is an object of this invention to produce novel, herbicidal compounds which overcome the aforementioned deficiencies. Other objects will become apparent from the following disclosure.

The novel compounds of the invention are halogen-containing arylcarbonyl arylcarbamoyl sulfides which can be represented by the following formula $$\begin{matrix} & O & & O & H \\ & \| & & \| & | \\ Y & -C & -S & -C & -N & -X \end{matrix}$$

wherein X is aryl which may be ring-substituted by at least one member of the group consisting of alkyl, alkoxy, chloro, bromo, and nitro radicals; Y is aryl, aralkyl, or aryloxyalkyl which may be ring-substituted by at least one member of the group consisting of chloro, bromo, and alkyl with the proviso that at least one of X and Y contain a halogen.

In general, X and Y of the above formula have from 6–10 carbon atoms each and from one to four halogen atoms, preferably chloride, in each of the halogen-containing aryl nuclei. Although the following examples are directed to chlorinated compounds, the corresponding brominated compounds can be prepared by the same methods and have the same stability and utility. Such compounds have been found to possess outstanding herbicidal activity and are unusually stable.

The novel compounds of the invention are readily prepared by the reaction of an aryl isocyanate with an aryl carbothiolic acid, at least one of which has a nuclear halogen.

The following examples serve to illustrate the preparation of the new compounds of this invention.

EXAMPLE I

*m* - Chlorophenylcarbamoyl 2,4 - dichlorophenoxyacetyl sulfide

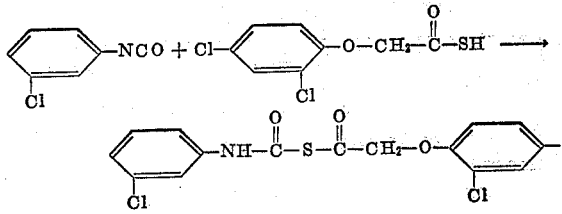

A solution of 14.2 g. (0.06 mole) of 2,4-dichlorophenoxythiolacetic acid in 135 ml. of 1:1 benzene:n-hexane was cooled to —5 to 0° C. and added with stirring to a solution of 9.2 g. (0.06 mole) of m-chlorophenyl isocyanate in 75 ml. of 1:1 benzene:n-hexane also cooled to —5 to 0° C. The temperature was kept at 0±5° C. during the addition, which resulted in the formation of a heavy white precipitate. To facilitate stirring, 165 ml. of the mixed solvent was added to the reaction mixture. After the mixture had been stirred for 15 minutes, the precipitate was separated by pressure filtration and washed successively with 50 ml. of mixed solvent and 100 ml. of n-pentane. The dried product comprised 22.2 g. (95%) of fine crystalline powder which melted at 130–131° with decomposition when the capillary tube was introduced into the bath at 128°.

*Analysis.*—Calcd. for $C_{15}H_{10}Cl_3NO_3S$: C, 46.2; H, 2.58; Cl, 27.3; N, 3.59; S, 8.20. Found: C, 46.2; H, 2.80; Cl, 27.4; N, 3.84; S, 8.16.

EXAMPLE II

*p-Chlorobenzoyl p-chlorophenylcarbamoyl sulfide*

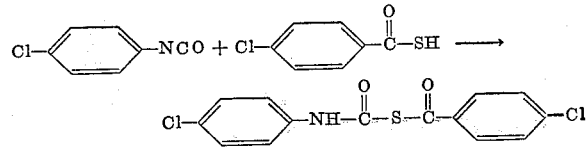

A solution of 17.3 g. (0.1 mole) of p-chlorothiolbenzoic acid in 300 ml. of n-pentane was added with stirring to a solution of 15.4 g. (0.1 mole) of p-chlorophenyl isocyanate in 350 ml. of n-pentane. White crystals precipitated, and 150 ml. of n-pentane was added to make the mixture more easily stirred. After the mixture had been stirred for 15 minutes, the crystals were separated on a pressure filter and washed with 250 ml. of pentane. The product comprised 31.1 g. (95%) of p-chlorobenzoyl p-chlorophenylcarbamoyl sulfide as white crystals with a yellowish tinge. When a melting-point capillary tube was immersed in the bath at 138°, the product melted at 140–142° with decomposition.

*Analysis.*—Calcd. for $C_{14}H_9Cl_2NO_2S$: C, 51.6; H, 2.78; Cl, 21.7; N, 4.30; S, 9.82. Found: C, 51.6; H, 2.80; Cl, 22.2; N, 4.34; S, 9.84.

Other compounds falling within the scope of the invention can be prepared in a similar manner as the foregoing examples by reacting an aryl thiol acid with an appropriate aryl isocyanate. Illustrative examples of aryl isocyanates are phenyl, p-chlorophenyl, 2-chlorophenyl, 3-bromo phenyl, α-naphthyl, 2,4-dichlorophenyl, 3,4-dichlorophenyl, 3-nitrophenyl, 4-ethoxyphenyl, p-tolyl; and 3-chloro-p-tolyl isocyanates.

Suitable aryl carbothiolic acids include thiolbenzoic, p-chlorothiolbenzoic, 2,3,6-trichlorothiolbenzoic, 2,3,5,6-tetrachlorothiolbenzoic, p-bromothiolbenzoic, α-naphthalenethiolacetic, 2,4-dichlorophenoxythiolacetic, 2,4,5-trichlorophenoxythiolacetic, phenylthiolacetic, p-chlorophenylthiolacetic, and 4-chloro-2-methylphenoxythiolacetic acids. The sole requirement is that at least one of the reactants contain at least one halogen substituent in an aryl ring.

Compounds that come within the scope of this invention include 4-chlorophenylcarbamoyl α-naphthaleneacetyl sulfide, 2,3,6-trichlorobenzoyl p-tolycarbamoyl sulfide, 2,4,5-trichlorophenoxyacetyl 4 - ethoxyphenylcarbamoyl sulfide, 3-bromophenylcarbamoyl p-chlorophenylacetyl sulfide, and 4-bromobenzoyl 3-nitrophenylcarbamoyl sulfide.

The reaction between the aryl carbothiolic acid and the aryl isocyanate takes place readily. The reaction is generally rapid and elevated temperatures are not necessary. Preferably the temperature is maintained within the range of −10° to 50° C. with room temperature being quite satisfactory. The time for reaction is dependent upon the temperature and usually the reaction is very rapid and takes place in a few minutes.

The reaction is conducted in a liquid phase with reactants maintained in solution. Volatile inert hydrocarbon solvents are advantageously employed. They dissolve the reactants and either serve as crystallization media for the new sulfides or are readily removed from the product.

In contrast to the halogen-substituted arylcarbonyl arylcarbamoyl sulfides which are stable at temperatures in excess of 100° C., the non-halogen-substituted arylcarbonyl arylcarbamoyl sulfides and corresponding alkyl and halogenated alkyl compounds are substantially unstable. For example, benzoyl phenylcarbamoyl sulfide

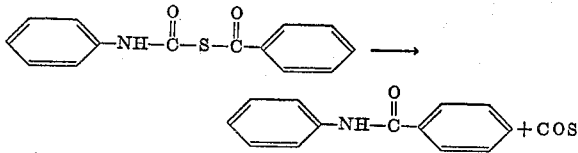

decomposes below its melting point, and very rapidly at its melting point of 92° C. The decomposition reaction proceeds as follows:

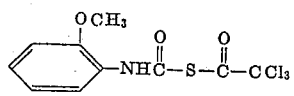

Acetyl phenylcarbamoyl sulfide, $$C_6H_5NH\overset{O}{\overset{\|}{C}}-S\overset{O}{\overset{\|}{C}}-CH_3$$

prepared by reaction of phenyl isocyanate with thiolacetic acid, is still more unstable as indicated in the following study of its properties: Attempted purification of acetyl phenylcarbamoyl sulfide by recrystallization from cyclohexane gave carbanilide and diacetyl sulfide. Heating acetyl phenylcarbamoyl sulfide in a flask at 75° C. gave vigorous evolution of carbon oxysulfide and formed acetanilide.

Trichloroacetyl o-methoxyphenylcarbamoyl sulfide,

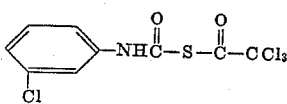

was obtained by the reaction of o-methoxyphenyl isocyanate in an 86% yield in the form of crystals melting at 75–76° C. The compound was unstable as shown by the fact that upon storage at 4° C. for nine days, the sulfide was converted to o-methoxytrichloroacetanilide. In a similar fashion, trichloroacetyl m-chlorophenylcarbamoyl sulfide,

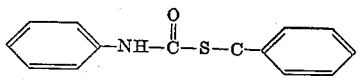
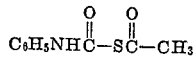

melting at 73–74° C., was prepared by the reaction of trichlorothiolacetic acid with m-chlorophenyl isocyanate. Within a week at room temperature, the sulfide decomposed to form N-m-chlorophenyltrichloroacetamide.

The new compounds of this invention have physiological activity and are particularly effective as herbicides. These compounds which are cellular regulants and particularly plant regulants can be applied in a number of ways. Generally they are formulated by mixture with a conventional carrier material or conditioning agent. This provides a formulation adapted for ready and efficient application to soils, weeds or unwanted plants using conventional applicator equipment. Thus these compounds can be formulated into herbicidal compositions such as described in Todd U.S. Patents 2,655,444 through 2,655,447.

Pest control adjuvants such as dusts, solvents, wetting, dispersing and emulsifying agents set out in U.S. Patent 2,426,417 can be employed in preparing the herbicidal compositions of the novel compounds of the present invention. Other wetting, dispersing and emulsifying agents such as those listed in detail in Bulletin E 607 of the Bureau of Entomology and Plant Quarantine of the U.S. Department of Agriculture and such as those set out in an article by McCutcheon in "Soap and Chemical Specialties," July through September 1955, entitled, "Synthetic Detergents and Emulsifiers," can also be used and are collectively known to the art as surface active agents.

Preferred herbicidal compositions of the compounds of the present invention are in the form of water-dispersible powders. They can be prepared by admixing one or more of the active compounds with a surface active agent and a finely divided solid carrier such as talc, pyrophyllite, natural clay, diatomaceous earth and other powdered diluents such as those set out in the aforementioned patents. The surface active agents are used in amounts sufficient to impart water-dispersibility to the powder.

Dust compositions can be prepared by admixing one or more of the active compounds with a finely divided carrier such as those set forth in the aforementioned patents. Liquid herbicidal compositions can be prepared by intimately dispersing or dissolving one or more of the active compounds in conventional organic liquid herbicidal carriers.

The herbicidal method of using the new compounds of the present invention comprises applying a compound of the invention ordinarily in a herbicidal composition of the aforementioned type to the locus or area to be protected from undesirable plant growth. The active compound is of course applied in sufficient amount to exert the desired herbicidal action. The application can be made directly upon the locus or area and the vegetation thereon during the period of infestation. Alternatively the application can be made in advance of anticipated weed infestation.

The dosage employed can be determined readily by those skilled in the art by conventional techniques. It is of course dependent upon the particular active ingredient employed and the nature of the formulation used, the type of treatment, the type of vegetation to be controlled, climatic conditions and the like. In general when applied as a foliar spray a dosage of about 20–60 pounds of the active ingredient per acre is used.

This method is applicable to the control of both broad-leaved and grassy annual and perennial weeds such as crab grass, Johnson grass, wild mustard, dandelion, lamb's quarters, rough pigweed, plantain, honeysuckle, Virginia creeper and poison ivy.

The compounds have selective action, for example p-chlorobenzoyl p-chlorophenylcarbamoyl sulfide when applied to a tomato plant in a concentration that does not harm the plant such as 0.2% concentration, controls early blight on this plant.

The following additional examples serve to illustrate the herbicidal compositions of the invention and methods of application.

An emulsifiable oil can be prepared by mixing the following components with agitation until a homogeneous solution is obtained.

| | Percent |
|---|---|
| m-Chlorophenylcarbamoyl 2,4-dichlorophenoxyacetyl-sulfide | 10 |
| Alkylated naphthalene (principally α-methylnaphthalene) | 85 |
| Alkyl, aryl polyether alcohol | 5 |

When added to water with mild agitation the above composition forms an emulsion suitable for spraying with conventional spray equipment. Alternatively it can be diluted with an herbicidal oil such as diesel oil and applied as an oil spray.

This composition can be extended with 100 gallons diesel oil and applied at the rate of 50 pounds of the active ingredient product per acre by use of a railroad spray car along a railroad right-of-way for control of honeysuckle, poison ivy, rough pigweeds, lamb's quarters, and crabgrass.

The following wettable powder can be prepared by blending the components in a ribbon blender, micropulverizing in a hammer mill until the product is substantially all below 50 microns, then reblending until homogeneous.

|  | Percent |
|---|---|
| p-Chlorobenzoyl p-chlorophenylcarbamoyl sulfide | 80.00 |
| Attapulgite clay | 18.25 |
| Alkyl naphthalene sulfonic acid, Na salt | 1.50 |
| Low viscosity methyl cellulose | 0.25 |

The above formulation can be extended with 200 gallons of water and applied at the rate of 60 pounds of active ingredient per acre by means of a hand operated pressure sprayer to a heavy infestation of a mixed population of annual and perennial broadleaf and grass species growing under a cyclone fence.

A dust of the following composition can be prepared by first blending together the active component and minor diluent and micropulverizing to an average particle size less than 50 microns, then combining with the major diluent and blending in a ribbon blender.

|  | Percent |
|---|---|
| m-Nitrophenylcarbamoyl 2,4,5-trichlorophenoxyacetyl sulfide | 20 |
| Diatomaceous silica | 10 |
| Micaceous talc | 70 |

This dust composition can be applied at the rate of 300 pounds per acre of the formulated product by use of a hand duster to a warehouse storage area infested with crabgrass, yellow foxtail, dandelion, and morning glory for control of these species.

The following composition can be blended and micropulverized, then mixed with 15–20% water and extruded under pressure through an orifice to produce rods which are cut into pellets and dried.

|  | Percent |
|---|---|
| p-Bromobenzoyl p-tolylcarbamoyl sulfide | 25 |
| Alkyl naphthalene sulfonic acid, Na salt | 1 |
| Anhydrous sodium sulfate | 10 |
| Non-swelling clay | 64 |

This formulation can be applied at the rate of 240 pounds per acre by hand to give excellent control of such undesirable vegetation as honeysuckle, Virginia creeper, and woody plants which are growing around highway signs and safety fences.

I claim:
1. The method for the control of weeds which comprises applying to the locus to be protected in an amount sufficient to exert a herbicidal effect, a compound of the following formula

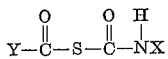

wherein X is a radical having from 6 to 10 carbon atoms and selected from the group consisting of unsubstituted aryl and aryl ring-substituted by at least one member of the group consisting of alkyl, alkoxy, chloro, bromo, and nitro radicals; Y is a radical having a carbon content of 6–10 and selected from the group consisting of aryl, ring-substituted aryl, aralkyl, ring-substituted aralkyl, aryloxyalkyl and ring-substituted aryloxyalkyl, said ring-substituted radicals being ring-substituted by at least one member of the group consisting of chloro, bromo, and alkyl with the proviso that at least one of X and Y contain a halogen.

2. A herbicidal composition comprising a herbicidal adjuvant and in a herbicidally effective amount a compound of the formula

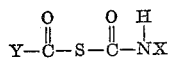

wherein X is a radical having a carbon content of 6–10 atoms and selected from the group consisting of unsubstituted aryl and aryl ring-substituted by at least one member of the group consisting of alkyl, alkoxy, chloro, bromo, and nitro radicals; Y is a radical having from 6 to 10 carbon atoms and selected from the group consisting of aryl, ring-substituted aryl, aralkyl, ring-substituted aralkyl, aryloxyalkyl and ring-substituted aryloxyalkyl, said ring-substituted radicals being ring-substituted by at least one member of the group consisting of chloro, bromo, and alkyl with the proviso that at least one of X and Y contain a halogen.

3. Novel compounds of the formula

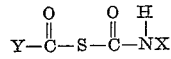

wherein X is a radical having a carbon content of 6–10 and selected from the group consisting of unsubstituted aryl and aryl ring-substituted by at least one member of the group consisting of alkyl, alkoxy, chloro, bromo, and nitro radicals; Y is a radical having from 6 to 10 carbon atoms and selected from the group consisting of aryl, ring-substituted aryl, aralkyl, ring-substituted aralkyl, aryloxyalkyl and ring-substituted aryloxyalkyl, said ring-substituted radicals being ring-substituted by at least one member of the group consisting of chloro, bromo, and alkyl with the proviso that at least one of X and Y contain a halogen.

4. A process comprising reacting in liquid phase and at a temperature of from −10 to 50° C. an aryl carbothiolic acid with a chlorinated aryl isocyanate.

No references cited.